US006158810A

United States Patent [19]

Galloway

[11] Patent Number: 6,158,810

[45] Date of Patent: Dec. 12, 2000

[54] CHAIR BACK TILT APPARATUS

[76] Inventor: Robert Galloway, P.O. Box 132, Kellerton, Iowa 50133

[21] Appl. No.: 09/193,639

[22] Filed: Nov. 17, 1998

[51] Int. Cl.[7] .......... B60N 2/02

[52] U.S. Cl. .......... 297/354.1; 297/DIG. 4; 297/353; 297/343

[58] Field of Search .......... 297/320, 322, 297/342, 343, 353, DIG. 4, 354.1

[56] References Cited

U.S. PATENT DOCUMENTS

| | | | |
|---|---|---|---|
| 2,746,520 | 5/1956 | Ducrot | 297/322 |
| 3,191,990 | 6/1965 | Rugg et al. | 297/DIG. 4 X |
| 4,949,408 | 8/1990 | Trkla | 297/DIG. 4 X |
| 5,094,508 | 3/1992 | Bathrick et al. | 297/320 |
| 5,195,803 | 3/1993 | Quintile | 297/353 X |
| 5,219,204 | 6/1993 | Bathrick et al. | 297/343 X |
| 5,320,412 | 6/1994 | Eakins et al. | 297/353 |
| 5,556,157 | 9/1996 | Wempe | 297/DIG. 4 X |

*Primary Examiner*—Peter M. Cuomo
*Assistant Examiner*—Stephen Vu
*Attorney, Agent, or Firm*—Brett J. Trout; Gunderson, Weindruch, Trout & Rhein, P.C.

[57] ABSTRACT

An improved chair back tilt apparatus for a wheelchair. The apparatus includes a seat and a back support pivotally coupled to the seat. A backrest is slidably coupled to the back support and coupled to the seat by a rigid L-shaped support. A linear motion actuator is secured between the seat and the back support to recline the seat. As the seat reclines, the L-shaped support pulls the backrest downward. The L-shaped support also forces the backrest upward as the seat is returned to its original position thereby substantially eliminating back shear associated with prior art back tilt systems.

11 Claims, 2 Drawing Sheets

CHAIR BACK TILT APPARATUS

FIELD OF THE INVENTION

This invention relates to a chair back tilt apparatus and, more particularly, to a wheelchair back tilt apparatus with linkages to reduce back shear as the back reclines and returns to its upright position.

BACKGROUND OF THE INVENTION

It is known in the art to provide a wheelchair having an automatic reclining backrest. It is also known in the art to provide a backrest which slides relative to a frame as the seat reclines and returns to its upright position, to reduce back shear on a user. An example of such a prior art device is described in U.S. Letters Pat. No. 5,556,157, issued to Wempe.

One drawback associated with such prior art devices such as Wempe is the inability to adjust the ratio of backrest slide relative to the back frame to account for larger or smaller users. In very large users, the pivot point between the legs and torso is positioned further away from the pivot point between the seat and the backrest. Accordingly, for such users it is desirable to have the backrest travel a large amount relative to the back frame as the seat is reclined. Conversely, for thin users, the pivot point between the user's legs and torso is closer to the pivot point between the seat and frame. In such cases, it would be desirable to provide for less sliding of the backrest relative to the back frame. Prior art devices, such as Wempe, use a single cable connection between the backrest and seat. This type of arrangement makes it difficult to adjust back shear between large and thin users.

An additional drawback associated with the prior art is the lack of means for sliding the backrest upward relative to the back frame as the seat is returned to its upright position. Devices such as that described in Wempe use a flexible cable connected between the seat and back frame to reduce back shear. While this assembly is useful to pull the backrest downward relative to the back frame, the resilient connection provides little upward pressure on the backrest relative to the back frame when the seat is returned to its upright position. Accordingly, the backrest is moved upward relative to the back frame only by the force of the user's back against the backrest, a force often insufficient to return the backrest to the full desired position. Accordingly, the seat reclines and returns to its upright position, the user becomes more and more slumped in the seat. It would be, therefore, desirable to provide means for fully raising the backrest relative to the back frame as the seat is moved into its full upright position It is also known in the art to provide independently controlled electric motors to move the backrest relative to the back frame. Such an assembly has several drawbacks. One drawback associated with such an assembly is the cost not only for initial assembly, but also for maintenance and repair. A second drawback associated with such an assembly is the tendency for such devices to move out of synchronization with the reclining and upright movement of the backrest. As such devices move out of synchronization, the backrest starts to move either too much or too little relative to the back frame, and may even tend to move the backrest in an undesired direction relative to the back frame, during the initial or final stages of the recline. Accordingly, it would be desirable to provide means for maintaining synchronization of the backrest relative to the back frame. The difficulties encountered in the prior art discussed herein above are substantially eliminated by the present invention.

SUMMARY OF THE INVENTION

An improved chair back tilt apparatus is provided, having a seat and a back support pivotally coupled thereto. Means are provided for tilting the back support relative to the seat, and a backrest is slidably coupled to the back support. Means are also provided for sliding the backrest down the back support in a predetermined proportion to a downward tilt of the back support, and for sliding the backrest up the back support in the predetermined proportion to an upward tilt of the back support.

In the preferred embodiment, the sliding means is a rigid L-shaped support, secured between the backrest and the seat. The tilting means is preferably a linear motion actuator, pivotally coupled to the seat and secured by a support bracket to the back support. Additionally, the L-shaped bracket is preferably provided with a plurality of attachment areas to adjust the predetermined proportion to accommodate the needs of a particular user.

DETAILED DESCRIPTION OF THE PREFERRED EMBODIMENT

Figure 1:
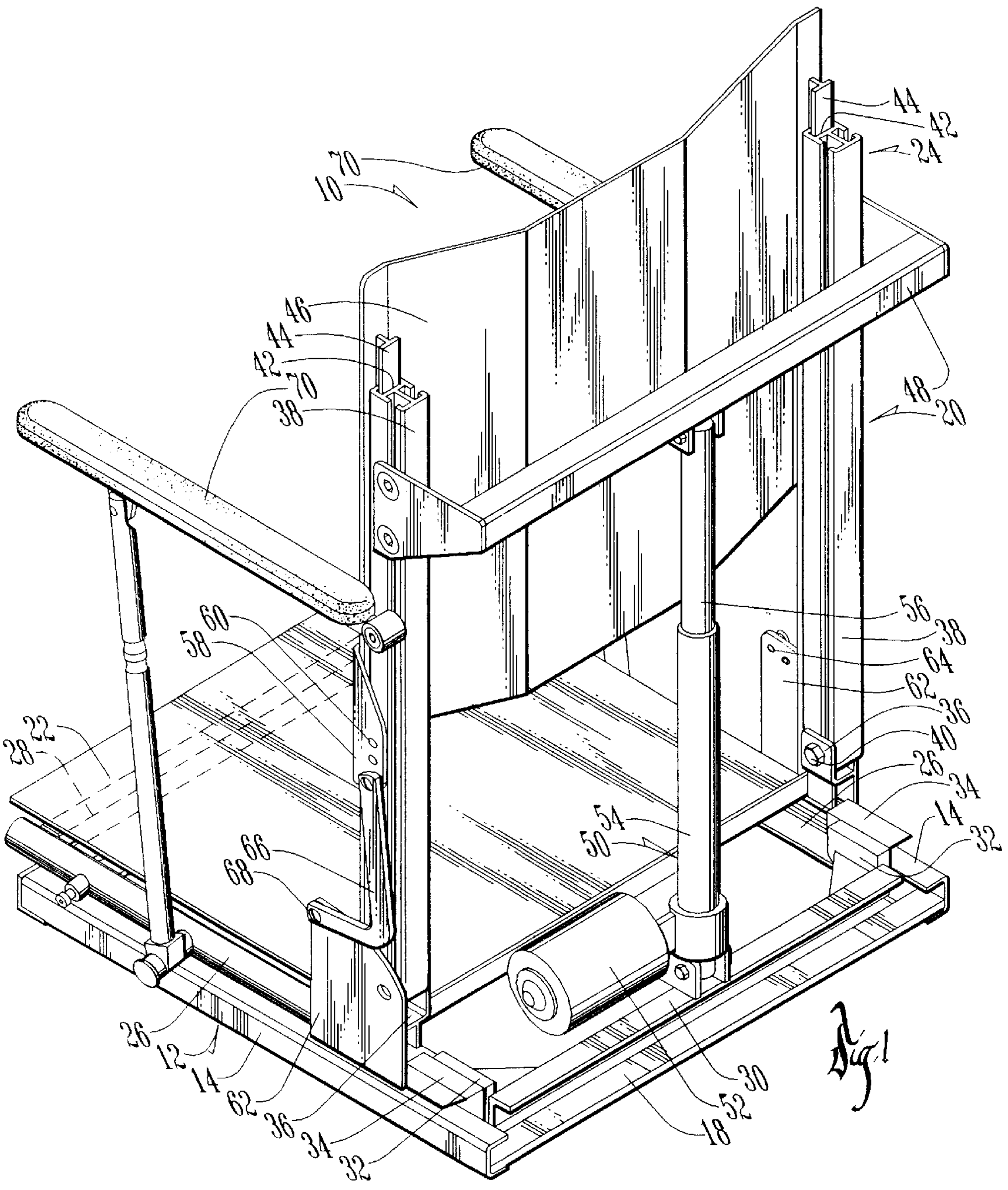
FIG. 1 is a rear perspective view of the chair back tilt apparatus of the present invention.
Figure 2:
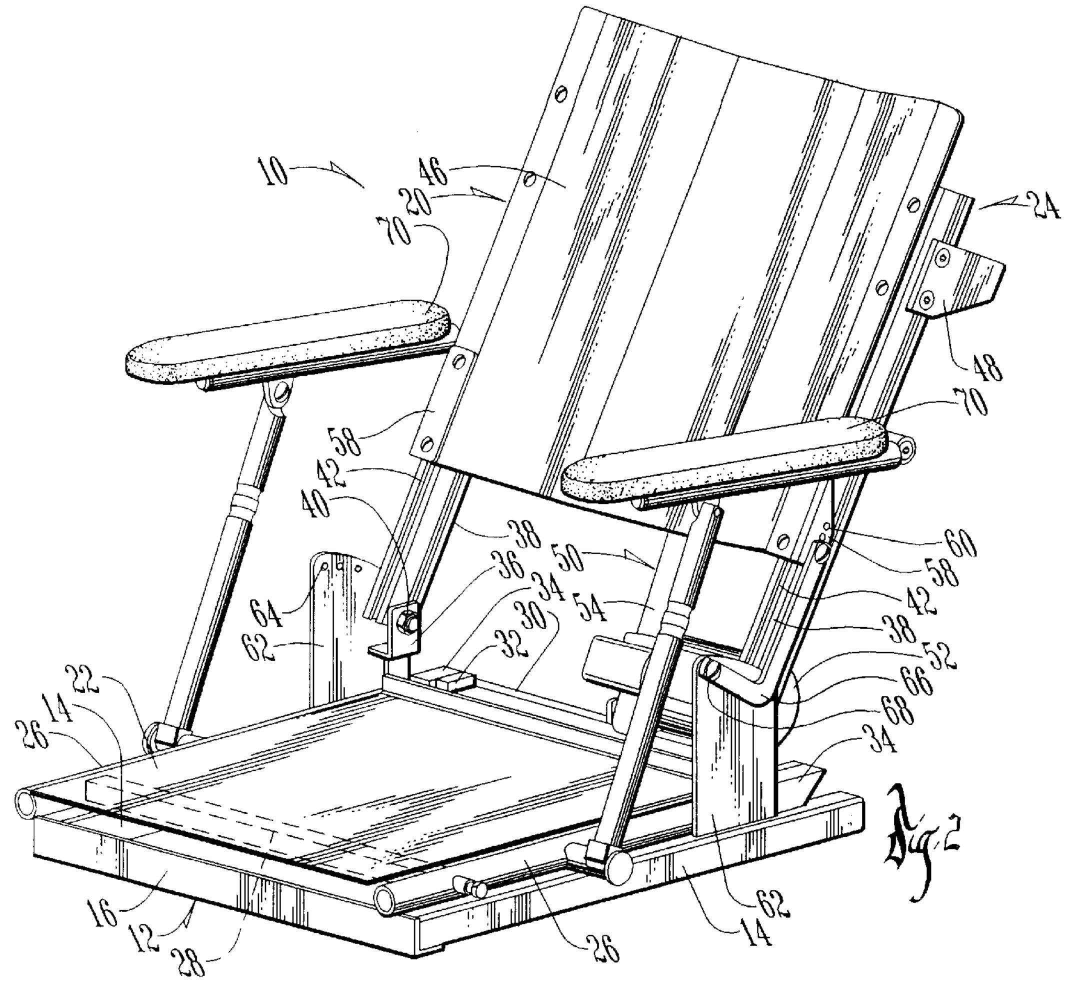
FIG. 2 is a front perspective view of the chair back tilt apparatus of FIG. 1.

With reference to the drawings, an improved chair back tilt apparatus is shown generally as (10) in FIG. 1. The chair back tilt apparatus (10) includes a steel base (12) constructed of a pair of side members (14), having a C-shaped cross section, a forward cross-member (16) and a rearward cross-member (18) (FIGS. 1–2). Slidably coupled to the base (12) is the chair assembly (20). The chair assembly (20) includes a seat (22) pivotally coupled to a back (24). The seat is preferably constructed of aluminum and includes a pair of side rails (26), a front rail (28), and a rear rail (30). The rear rail (30) is welded or otherwise secured to a pair of roller mounts (32). The roller mounts (32) are rotatably coupled to a pair of rollers (not shown), which roll inside the side members (14) of the base (12), and allow the chair assembly (20) to slide relative to the base (12). The roller mounts (32) are welded or otherwise secured to a pair of rear brackets (34). The rear brackets (34), in turn, are secured to the side rails (26) of the seat (22).

Welded to the side rails (26) are a pair of back brackets (36) (FIGS. 1–2). The back brackets (36) are pivotally coupled to a pair of back support members (38) by a pair of bolts (40). The back support members (38) are provided with keyways (42). Provided within these keyways (42), in slidable relationship to the back support members (38), are a pair of glides (44). The glides (44) may be constructed of nylon, Teflon, or similar low friction material. The glides (44) are bolted or otherwise secured to a backrest (46), which may be constructed of aluminum or hard plastic, and coated with vinyl, leather or similar supple material, such as those known in the art.

Secured between the back support members (38) is a support bracket (48)(FIG. 1). Pivotally secured to the support bracket (48) is an electric linear motion actuator (50) that is also pivotally secured to the rear rail (30) of the seat (22). Alternatively, a hydraulic piston may be used in place of the electric linear motion actuator (50). The linear motion actuator (50) includes a motor (52), an outer sleeve (54), and an inner sleeve (56). Provided on the backrest (46) are a pair of ears (58), each provided with a plurality of adjustment holes (60).

Figure 3:
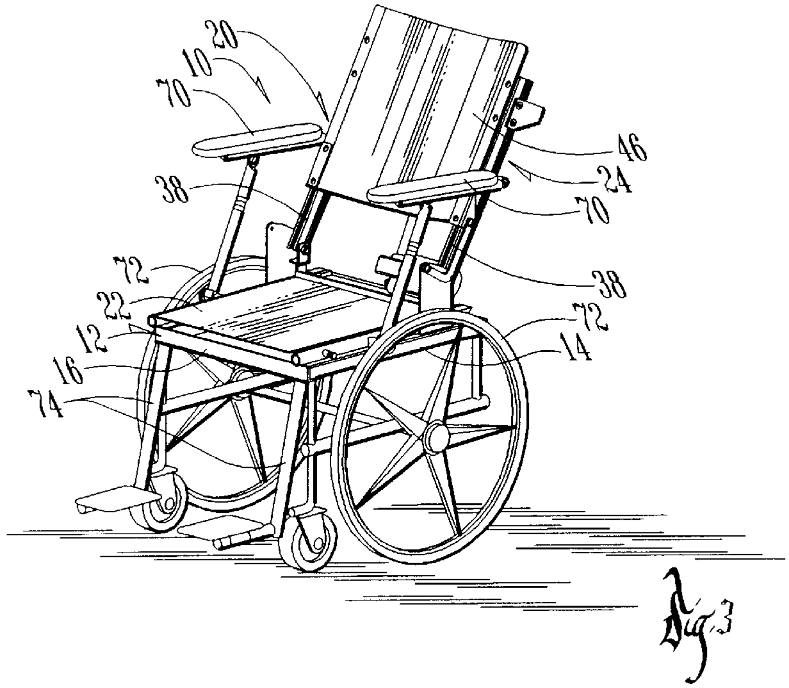
FIG. 3 is a perspective view of the entire wheelchair.

The adjustment holes (60) allow the backrest (46) to be adjusted up or down to accommodate users of different heights. In the preferred embodiment, the ears (58) may be inverted and exchanged side to side to provide an additional range of adjustment. Secured to the side rails (26) are a pair of bracing brackets (62) having attachment holes (64). Secured between the ears (58) and bracing brackets (62) is a pair of L-shaped steel linkages (66). The linkages (66) are connected to the ears (58) and bracing bracket (62) by bolts (68) or similar pivotal connection means. As shown in FIGS. 2–3, the chair back tilt apparatus (10) may be provided with arm rests (70), wheels (72), leg extensions (74) and other similar items found on prior art wheelchairs.

When it is desired to operate the chair back tilt apparatus of the present invention, the apparatus (10) is initially positioned in the full, upright position as shown in FIG. 1. The motor (52) is then actuated to retract the inner sleeve (56) into the outer sleeve (54) of the linear motion actuator (50). This pulls the support bracket (48) toward the rear rail (30), thereby causing the back support members (38) to tilt rearward relative to the seat (22). As the back (24) of the apparatus (10) tilts rearward, the linkages (66) pull the backrest (46) downward relative to the back support members (38), a predetermined incremental amount relative to the incremental degree of recline. By attaching the linkages to different attachment holes (64), the proportion of slide relative to the back support members (38) for each incremental degree of recline can be manipulated to suit a particular user.

Generally, for heavier users, the pivot point between the user's legs (not shown) and torso (not shown) is far away from the connection point between the back support members (38) and back bracket (36). The predetermined amount of movement of the backrest (46) relative to incremental degree of recline is relatively large. Conversely, for smaller users, the pivot point between the user's legs (not shown) and torso (not shown) is closer to the connection point between the back support members (38) and back brackets (36). The predetermined amount of movement of the backrest (46) relative to the incremental degree of recline is, therefore, much smaller. Securing the linkages (66) to different holes (60) and (64), allows the apparatus to accommodate both large and small users.

By constructing the linkages (66) out of rigid material, rather than a flexible cable, the chair back tilt apparatus (10) of the present invention not only pulls the backrest (46) downward relative to the back support members (38) as the back (24) reclines, but the linkages (66) push the backrest (46) upward relative to the back support members (38) as the back (24) is returned to its full, upright position. Additionally, the direct mechanical linkage between the backrest (46) and seat (22) prevents movement of the backrest (46) relative to the back support members (38) from becoming out of synchronization relative to the recline and return to upright position of the back (24).

The foregoing description and drawings merely explain and illustrate the invention, and the invention is not limited thereto, except insofar as the claims are so limited, as those skilled in the art who have the disclosure before them will be able to made modifications and variations therein without departing from the scope of the invention. For example, it is anticipated that the chair back tilt apparatus (10) and linkages (66) may be constructed of any suitable dimensions.

What is claimed is:

1. An improved chair back tilt apparatus comprising:

(a) a seat;

(b) a back support pivotally coupled to said seat;

(c) a backrest slidably coupled to said back support;

(d) means for tilting said back support relative to said seat;

(e) means for sliding said backrest down said back support in a predetermined proportion to a downward tilt of said back support, and for sliding said backrest up said back support in said predetermined proportion to an upward tilt of said back support; and (f) means secured to said back rest for raising said back rest against a weight of a user positioned against said backrest.

2. The improved chair back tilt apparatus of claim 1, further comprising means for adjusting said predetermined proportion.

3. The improved chair back tilt apparatus of claim 2, wherein said adjusting means is a support secured to said seat and provided with a plurality of holes.

4. The improved chair back tilt apparatus of claim 1, wherein said sliding means is a rigid support coupled to said backrest.

5. The improved chair back tilt apparatus of claim 4, wherein said rigid support is generally L-shaped.

6. The improved chair back tilt apparatus of claim 1, further comprising a pair of wheels coupled to said seat.

7. An improved chair back tilt apparatus comprising:

(a) a seat;

(b) a back support pivotally coupled to said seat;

(c) a backrest slidably coupled to said back support;

(d) a rigid linkage coupled between said seat and said backrest;

(e) means for tilting said back support relative to said seat; and (f) means secured to said back rest for raising said back rest against a weight of a user positioned against said backrest.

8. The improved chair back tilt apparatus of claim 7, further comprising means for adjusting said rigid linkage.

9. The improved chair back tilt apparatus of claim 7, wherein said adjusting means is a support coupled to said seat and provided with a plurality of holes.

10. The improved chair back tilt apparatus of claim 7, wherein said rigid support is generally L-shaped.

11. The improved chair back tilt apparatus of claim 7, further comprising at least two wheels coupled to said seat.

* * * * *